United States Patent
Yuan

(10) Patent No.: US 6,991,721 B2
(45) Date of Patent: Jan. 31, 2006

(54) WATER FILTER AND PUMP

(75) Inventor: Kuang Cheung Yuan, Longjiang (CN)

(73) Assignee: Aqua-Leisure Industries, INC, Avon, MA (US)

( * ) Notice: Subject to any disclaimer, the term of this patent is extended or adjusted under 35 U.S.C. 154(b) by 0 days.

(21) Appl. No.: 10/378,286

(22) Filed: Mar. 3, 2003

(65) Prior Publication Data

US 2004/0173517 A1  Sep. 9, 2004

(51) Int. Cl.
*B01D 35/02* (2006.01)
*F04D 29/70* (2006.01)

(52) U.S. Cl. ............... 210/94; 210/232; 210/250; 210/416.1; 415/121.2

(58) Field of Classification Search ............ 210/94, 210/169, 232, 250, 416.1, 416.2; 415/121.2
See application file for complete search history.

(56) References Cited

U.S. PATENT DOCUMENTS

| | | | | |
|---|---|---|---|---|
| 2,100,482 A | * | 11/1937 | Irwine | 210/354 |
| 3,040,973 A | * | 6/1962 | Wessling | 418/13 |
| 3,356,218 A | * | 12/1967 | Grudoski | 210/167 |
| 3,630,373 A | * | 12/1971 | Grazen | 415/198.1 |
| 3,736,075 A | * | 5/1973 | Otto | 417/366 |
| 3,767,050 A | * | 10/1973 | Reiner | 210/169 |
| 3,794,052 A | * | 2/1974 | Koble et al. | 134/167 R |
| 4,043,917 A | * | 8/1977 | Rowley et al. | 210/323.2 |
| 4,219,423 A | * | 8/1980 | Smith, Jr. | 210/169 |
| 4,545,906 A | * | 10/1985 | Frederick | 210/138 |
| 4,601,821 A | * | 7/1986 | Sherman et al. | 210/169 |
| 4,622,137 A | * | 11/1986 | Kessler | 210/169 |
| 5,062,951 A | * | 11/1991 | Tominaga | 210/169 |
| 5,133,854 A | * | 7/1992 | Horvath | 210/121 |
| 5,449,454 A | * | 9/1995 | Hickok | 210/188 |
| 5,641,399 A | * | 6/1997 | Rawlins | 210/169 |
| 6,475,378 B1 | * | 11/2002 | Shi | 210/90 |
| 6,659,717 B1 | * | 12/2003 | Kao | 415/121.2 |

FOREIGN PATENT DOCUMENTS

EP  0498207 A1 * 1/1992

OTHER PUBLICATIONS

U.S. Appl. No. 10/360,520, filed Feb. 6, 2003, Self-Rising Swimming Pool Construction.
U.S. Appl. No. 10/378,561, filed Mar. 3, 2003, Coaxial Filter and Pump.
U.S. Appl. No. 10/378,542, filed Mar. 3, 2003, Child-Proof Valve for Swimming Pool.

* cited by examiner

*Primary Examiner*—Fred G. Prince

(57) ABSTRACT

A water filtration and pumping apparatus typically for use with swimming pools includes a pump casing having mounted therein an electric motor driving an impeller within an impeller housing. The impeller housing has a water inlet. A filter casing mounted directly atop of the pump casing has a water outlet. The filter casing is attached to the pump casing via a number of support legs extending between the two casings. One of the support legs provides a water flow passage between the impeller housing and the filter casing via which water from the water inlet pumped by the impeller passes en route to the filter casing for filtration and dispensation via the water outlet.

14 Claims, 3 Drawing Sheets

WATER FILTER AND PUMP

BACKGROUND

Swimming pool water filtration and pumping assemblies are commonly large and heavy. The pump and filter are generally housed in separate units connected by PVC piping. A licensed plumber or pool expert is generally required to configure the pump and filter and put them into operation. In addition, swimming pool filter elements are commonly complex and flimsy in construction, requiring special effort in cleaning and maintenance. The flimsy nature of filter elements also renders them susceptible to damage, should water-flow from the pump impinge upon them directly.

SUMMARY

Disclosed herein are unitary water filtration and pumping assemblies configured such that no external plumbing is required between the pump and filter. Also disclosed herein are compact unitary water filter and pump apparatus having means protecting the filter's element from damage that might be caused by direct high velocity impingement of water flow thereon. Also disclosed herein are compact water filter and pump combinations wherein the filter element size is maximized with respect to the size of its casing, yet remains shielded from direct high-velocity impingement of water from the pump.

In one exemplary embodiment, a water filtration and pumping apparatus may comprise a pump casing having mounted therein a motor driving an impeller within an impeller housing, the impeller housing having a water inlet, and a filter casing having a water outlet, the filter casing being attached to the pump casing via at least one support leg extending between the two casings, wherein the at least one support leg provides a water flow passage between the impeller housing and the filter casing via which water from the water inlet pumped by the impeller passes en route to the filter casing for filtration and dispensation via the water outlet.

In another exemplary embodiment, the water filtration and pumping apparatus may further comprise a replaceable filter cartridge.

In still another exemplary embodiment, the water filtration and pumping apparatus may further comprise a filter shield within which a portion of the filter cartridge is received, the filter shield being positioned adjacent to the water flow passage.

In still another exemplary embodiment, the filter shield may comprise an annular wall.

In still another exemplary embodiment, the filter casing may be sufficiently translucent to enable observation of the filter cartridge.

In another exemplary embodiment, the pump casing may further comprise a longitudinal axis, and the water inlet extends substantially along the longitudinal axis of the pump casing.

In another exemplary embodiment, the filter casing further comprises a longitudinal axis, and the water outlet extends substantially along the longitudinal axis of the filter casing.

In another exemplary embodiment, the pump casing may further comprise an access plate attached to a bottom surface thereof, the access plate having ventilation apertures presented downwardly.

BRIEF DESCRIPTION OF THE DRAWINGS

These and other features and advantages of the water filter and pump assemblies disclosed herein will be more fully understood by reference to the following detailed description, in conjunction with the attached drawings in which like reference numerals refer to like elements through the different views. The drawings illustrate principles of the apparatus disclosed herein, and are not to scale.

DETAILED DESCRIPTION OF EXEMPLARY EMBODIMENTS

To provide an overall understanding, certain illustrative embodiments will now be described; however, it will be understood by one of ordinary skill in the art that the devices and methods described herein can be adapted and modified to provide devices and methods for other suitable applications and that other additions and modifications can be made without departing from the scope of the systems described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, specified, interchanged, and/or rearranged without departing from the disclosed devices or methods. Additionally, the shapes and sizes of components are also exemplary, and unless otherwise specified, can be altered without affecting the disclosed devices or methods.

Figure 1:
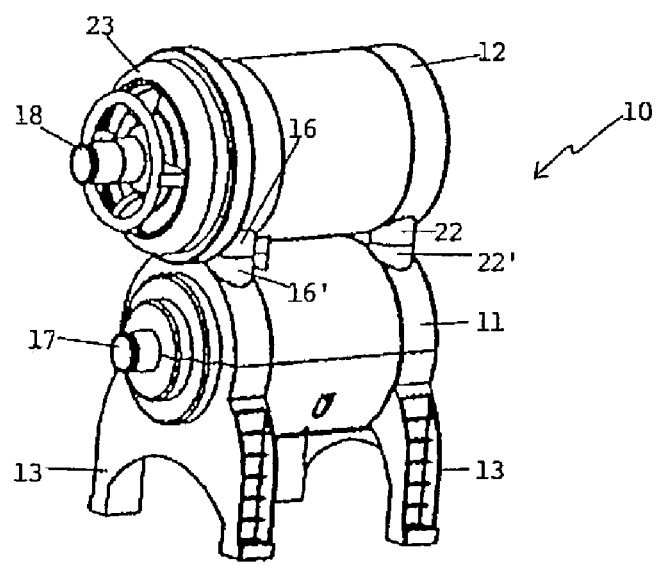
FIG. 1 is a schematic perspective illustration of a water filter and pump assembly.

FIG. 1 schematically depicts a filter and pump assembly 10, comprising a pump casing 11 and a filter casing 12. The pump casing 11, which houses both an impeller 20 and a motor 21, may have a number of downwardly depending feet 13 to support the assembly upon a flat surface. The filter casing 12 may be mounted atop the pump casing 11, as illustrated in FIG. 1. Alternatively, the filter casing 12 may be mounted alongside the pump casing 11. Casings 11 and 12 may be fabricated from moulded plastic material such as PVC. However, any other suitable plastic, metal, or composite material may be used.

The pump casing 11 may be substantially cylindrical, with its longitudinal axis disposed horizontally. The pump casing has a water inlet 17 via which water is drawn from a swimming pool (via a pipe connected thereto) by an impeller 20 located within an impeller housing 19 that is located within the pump casing 11. The water inlet 17 may be co-linear with the longitudinal axis of the pump casing. A motor 21, which may be a compact high-output electric motor, drives the impeller 20.

Communicating with the impeller housing 19 is a water passage 16 via which water pumped by the impeller passes en route to the filter casing 12. This configuration provides a unitary water filtration and pumping apparatus, having no external plumbing between the pump and filter.

Figure 6:
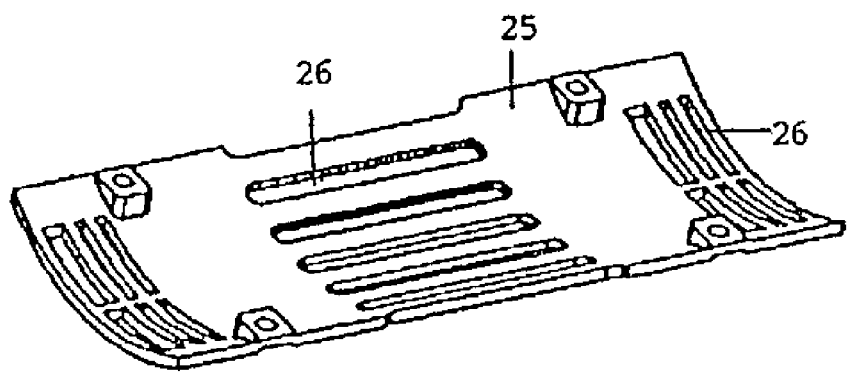
FIG. 6 is a schematic perspective illustration of a cooling plate attached to the under-side of the pump casing.

In an exemplary embodiment, there may be an access and ventilation plate 25 mounted to the bottom of the pump casing 11 to enable cooling of the motor 21 and access thereto for servicing. The plate 25 has cooling apertures or slots 26 as shown in the exemplary embodiment illustrated in FIG. 6. Where the pumping assembly is used outdoors, the downwardly presented cooling apertures may serve to prevent the ingress of rainwater to the electric motor.

Referring again to FIGS. 1 and 2, the filter casing 12 may also be substantially cylindrical, having a longitudinal axis. In the illustrated embodiment, the longitudinal axes of the two casings are parallel to one another. The filter casing 12 may include a cover 23 that is threaded onto external thread 27 of the casing. There may be a rubber O-ring interposed between the filter casing 12 and cover 23 to provide a water-tight seal. Extending from the cover 23 is a water outlet 18. The water outlet 18 may be co-linear with the longitudinal axis of the filter casing 12. In the illustrated embodiment, the inlet 17 and outlet 18 are parallel to one another.

Positioned within the filter casing 12 is a replaceable filter cartridge 14. The filter cartridge 14 may include a pleated annular element much like a paper air-filter cartridge used in automobiles, having a hollow centre and a metallic perforated tube surrounded by the filter medium. Each end of the filter cartridge may be provided with a soft plastic sealing ring 28 that each bear against respective internal end surfaces of the casing 12. The hollow interior (defined by the metallic perforated tube) communicates with the water outlet 18.

In one embodiment, the filter casing 12 may be formed of translucent plastic material, allowing observation or inspection of the filter element 14, while the unit is in operation and without disassembling the casing.

Figure 3:
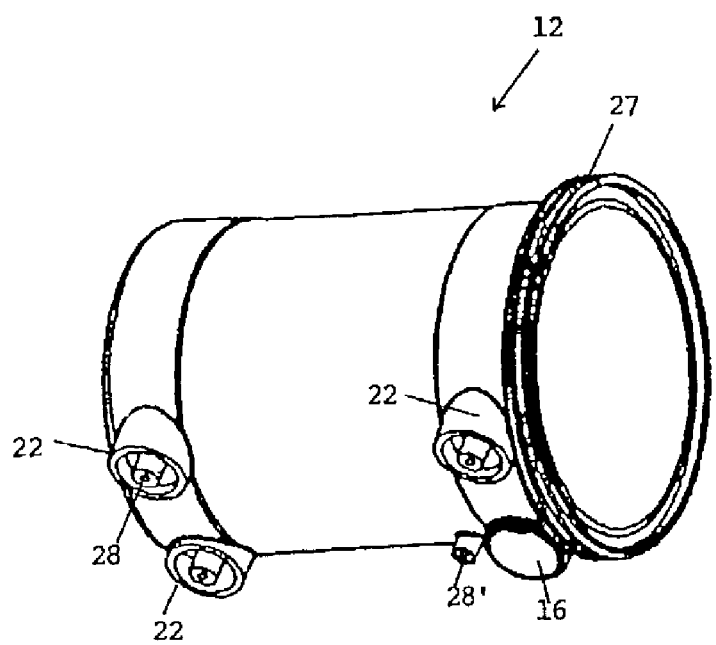
FIG. 3 is a schematic perspective view from below of part of a filter casing.
Figure 5:
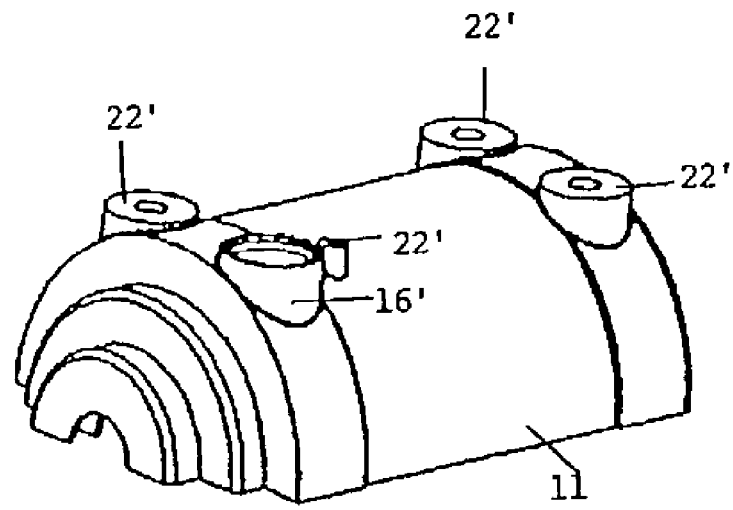
FIG. 5 is a schematic perspective illustration from above of a top part of the pump casing.

The filter casing 12 may be connected to the pump casing 11 by means of a water passage 16 and, if desired, at least one support leg 22. In the embodiment illustrated in the figures, three support legs 22 and a water passage 16 that looks from the outside like one of the support legs 22 are formed integrally with the filter casing 12, as illustrated schematically in FIG. 3. Passage 16 opens to the interior of the filter casing 12. The upper portion of the pump casing 11 may feature support platforms 22' in positions corresponding to the support legs 22 of the filter casing 12, as illustrated schematically in FIG. 5.

In one embodiment, the pump casing 11 may be joined to the filter casing by means of stainless-steel screws applied upwardly through central apertures in each support platform 22 to be received within pre-tapped holes 28 at the center of each support leg 22. There is an auxiliary pre-tapped hole 28' alongside the water passage 16 for receipt of a stainless-steel screw passing through an auxiliary support 22' shown alongside passage 16' of the pump case 11 in FIG. 5. There may be provided an O-ring or other seal between the passage parts 16 and 16'. As discussed previously, the configuration described allows the water pump and water filter to reside in close proximity, providing a compact filter and pump assembly and eliminating the need for external plumbing.

Figure 2:
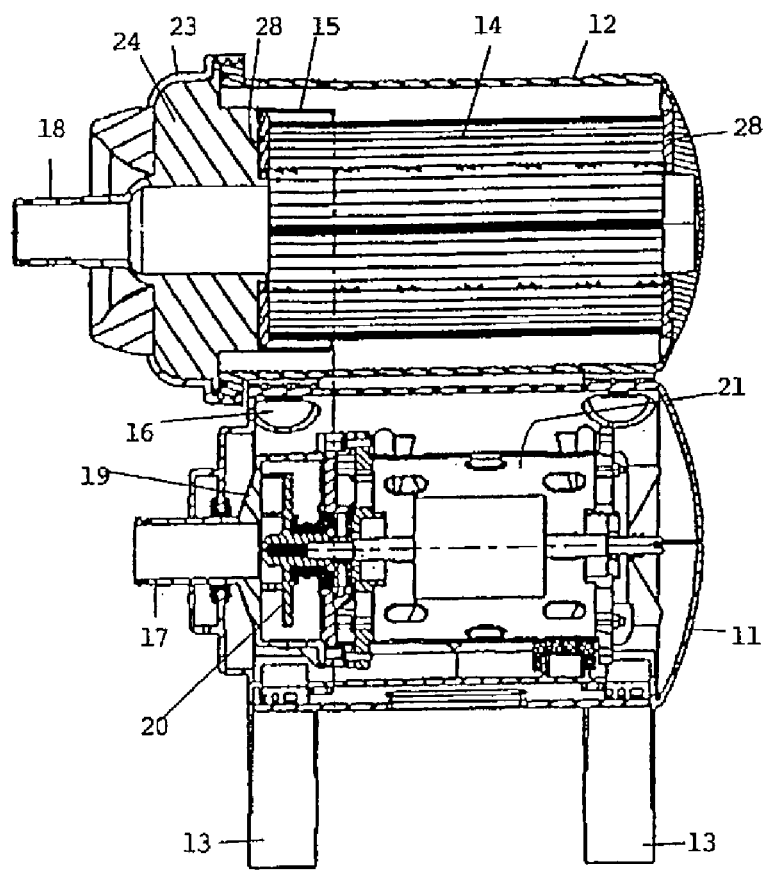
FIG. 2 is a schematic cross-sectional elevational view of the assembly of FIG. 1.
Figure 4:
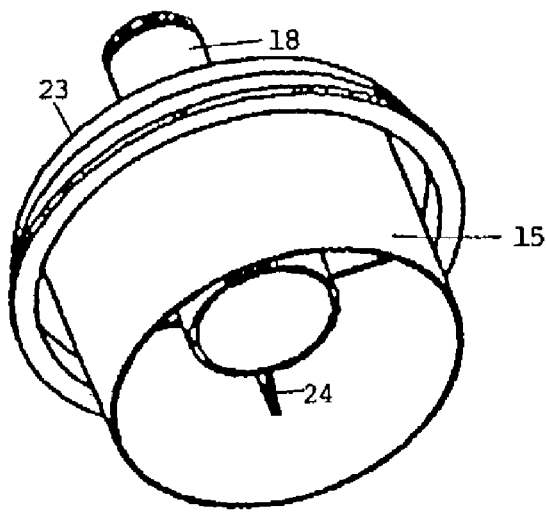
FIG. 4 is a schematic prospective illustration of a filter casing cover having formed integrally there with an annular filter shield and a water outlet.

In the embodiment illustrated in FIGS. 2 and 4, there is an annular filter shield 15 formed integrally with the cover 23. The shield 15 may be reinforced by a number of support ribs 24 extending from the passage that leads to the water outlet 18. The shield 15 partly surrounds an end portion of the filter cartridge 14 and protects that part of the filter cartridge from high-pressure or high-velocity water flowing through water passage 16. This arrangement enables a greater proportion of the overall length of the filter casing 12 to be filled with filter cartridge 14 than might otherwise be possible. That is, without the shield, a smaller filter cartridge 14 would have to be used to allow room for water to flow in through passage 16 without impinging directly on the filter cartridge 14.

The water filter and pump assembly disclosed herein can be used with spa pools, spa baths, or any other application requiring water-filtration.

What is claimed is:

1. A water filtration and pumping apparatus comprising:
an impeller within an impeller housing having a water inlet, and a motor driving the impeller, the motor and the impeller housing being enclosed within a pump casing;
the pump casing having an underside, wherein an access plate with ventilation apertures is attached to the underside of the pump casing; and
a filter casing having a water outlet and housing a filter cartridge, and comprising a filter shield within which a portion of the filter cartridge is received, the filter shield comprising an annular wall;
wherein the filter casing is attached to the pump casing via at least one support leg extending between the pump casing and the filter casing, and wherein water from the water inlet pumped by the impeller passes through one of the at least one support legs to the filter casing for filtration, and exits via the water outlet.

2. The water filtration and pumping apparatus of claim 1, wherein the filter casing is sufficiently translucent to enable observation of the filter cartridge.

3. A water filtration and pumping apparatus comprising:
a pump casing having mounted therein a motor driving an impeller within an impeller housing, said impeller housing having a water inlet; and
a filter casing having a water outlet, said filter casing being attached to said pump casing via at least one support leg extending between said pump casing and said filter casing, wherein one of said at least one support legs provides a water flow passage between said impeller housing and said filter casing via which water from said water inlet pumped by said impeller passes en route to said filter casing for filtration and dispensation via the water outlet; said filter casing comprises a filter cartridge and a filter shield within which a portion of said filter cartridge is received; and said filter shield being positioned adjacent to said water flow passage.

4. The apparatus of claim 1, wherein said filter shield comprises an annular wall.

5. The apparatus of claim 4, wherein said filter casing is sufficiently translucent to enable observation of the filter cartridge.

6. The apparatus of claim 5, wherein said motor is configured horizontally and has an output shaft driving said impeller.

7. The apparatus of claim 6, wherein said pump casing is substantially cylindrical.

8. The apparatus of claim 7, wherein said filter casing is substantially cylindrical and houses a replaceable filter cartridge.

9. The apparatus of claim 8, wherein said filter casing is mounted atop of said pump casing.

10. The apparatus of claim 9, wherein said pump casing further comprises a longitudinal axis and said water inlet extends substantially along said longitudinal axis of said pump casing.

11. The apparatus of claim 10, wherein said filter casing further comprises a longitudinal axis and said water outlet extends substantially along said longitudinal axis of said filter casing.

12. The apparatus of claim 11, wherein said water inlet and said water outlet extend parallel with respect to one another.

13. The apparatus of claim 12, wherein said pump casing further comprises an access plate attached to a bottom surface thereof; said access plate having ventilation apertures presented downwardly.

14. The apparatus of claim 13, wherein said pump casing further comprises a plurality of downwardly depending feet by which the apparatus is supported.

* * * * *